(12) United States Patent
Han

(10) Patent No.: US 9,761,155 B2
(45) Date of Patent: Sep. 12, 2017

(54) SKIN TOUCH TEMPERATURE TEST APPARATUS AND METHOD

(71) Applicant: Futurewei Technologies, Inc., Plano, TX (US)

(72) Inventor: Qian Han, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 447 days.

(21) Appl. No.: 14/446,196

(22) Filed: Jul. 29, 2014

(65) Prior Publication Data

US 2016/0033432 A1 Feb. 4, 2016

(51) Int. Cl.
*G01K 1/16* (2006.01)
*G01K 13/00* (2006.01)
*G09B 23/30* (2006.01)

(52) U.S. Cl.
CPC .............. *G09B 23/30* (2013.01); *G01K 1/16* (2013.01); *G01K 13/00* (2013.01); *G01K 2213/00* (2013.01)

(58) Field of Classification Search
CPC ..................................................... G09B 23/30
See application file for complete search history.

(56) References Cited

U.S. PATENT DOCUMENTS

| | | | | |
|---|---|---|---|---|
| 5,409,382 A * | 4/1995 | Donnelly | ............... | G09B 23/30 434/262 |
| 6,083,166 A * | 7/2000 | Holdaway | ............... | A61B 18/00 600/439 |
| 6,543,657 B2 * | 4/2003 | Fan | ...................... | G01N 33/367 223/66 |
| 6,931,951 B2 * | 8/2005 | Wright | .............. | A61F 13/15203 73/159 |
| 7,320,261 B1 * | 1/2008 | Hockaday | ............... | A61F 9/028 73/865.6 |
| 9,377,368 B2 * | 6/2016 | Kieliszek | ............... | G01K 13/02 |
| 9,451,911 B1 * | 9/2016 | Mirov | .................. | A61B 5/1495 |
| 2014/0377731 A1 * | 12/2014 | Conrad | ................ | G09B 23/303 434/268 |

FOREIGN PATENT DOCUMENTS

CN 201259446 Y * 6/2009
JP 2006010320 A * 1/2006

* cited by examiner

*Primary Examiner* — Clayton E Laballe
*Assistant Examiner* — Leon W Rhodes, Jr.
(74) *Attorney, Agent, or Firm* — Schwegman Lundberg & Woessner, P.A.

(57) ABSTRACT

A method for simulating an effect of surface temperature of an electronic device on skin of a human being when the electronic device is touched by the human being. The method comprises applying heat to a material within a cavity of a body, the body comprising a first end, a second end, an outer surface, and an inner surface that defines the cavity extending between the first end and the second end. The outer surface and the material have heat and thermal conductivity properties similar to human skin. The method comprises sensing a temperature of the material, and sensing a temperature of at least a portion of the outer surface when the portion of the outer surface contacts the electronic device.

25 Claims, 3 Drawing Sheets

SKIN TOUCH TEMPERATURE TEST APPARATUS AND METHOD

TECHNICAL FIELD

The present disclosure is generally directed to a testing apparatus. The testing apparatus simulates an effect of a surface temperature of an electronic device on human skin when the electronic device is touched by a human being.

BACKGROUND

Exposing a human being's skin to an extreme temperature environment, such as high heat levels, or for long time periods when in contact with a portable electronic device, places it at risk if the exposure exceeds their tolerance. At present there are no known hand models used for thermal safety testing of portable electronic devices.

Accordingly, there is a need for a testing apparatus that can mimic the heat transfer mechanisms of human skin to simulate an effect of a surface temperature of an electronic device on a human being's skin, such as the skin of a human appendage or human torso, when the electronic device is being touched by the human being's skin.

SUMMARY

According to one embodiment, there is provided a testing apparatus for simulating an effect of a surface temperature of an electronic device on skin of a human being when the electronic device is touched by the human being. The testing apparatus comprises a body that includes a first end, a second end, an outer surface, and an inner surface that defines a cavity extending between the first end and the second end. The body is configured to receive a material, where the outer surface and the material have heat and thermal conductivity properties similar to human skin. The testing apparatus comprises a heating system coupled to the body assembly and comprising at least one heating element positioned within the cavity. The at least one heating element extends at least partially through the material. The heating system is configured to supply heat to at least a portion of the material to increase a temperature of the material. The testing apparatus comprises a sensing system coupled to the body. The sensing system comprises a first sensing element positioned within the cavity and within the material. The first sensing element is configured to sense a temperature of the material. The sensing system comprises a second sensing element coupled to the outer surface. The second sensing element is configured to sense a temperature of at least a portion of the outer surface when the portion of the outer surface is in physical contact with the electronic device.

In another embodiment, there is provided a method for simulating an effect of a surface temperature of an electronic device on skin of a human being when the electronic device is being touched by the human being. The method comprises applying heat to a material within a cavity of a body, the body comprising a first end, a second end, an outer surface, and an inner surface that defines the cavity extending between the first end and the second end. The outer surface and the material have heat and thermal conductivity properties similar to human skin. The method comprises sensing a change in temperature of the outer surface when the electronic device is in physical contact with the outer surface.

In another embodiment, there is provided a testing system for simulating an effect of a surface temperature of an electronic device on skin of a human being when the electronic device is touched by the human being. The testing system comprises a processor and memory coupled to the processor comprising instructions that, when executed by the processor, cause the processor to operate a heating system that is coupled to a body that contains a material to apply heat to the material. The body comprises a first end, a second end, an outer surface, and an inner surface that defines a cavity extending between the first end and the second end. The outer surface has heat and thermal conductivity properties similar to human skin. The testing system comprises instructions that, when executed by the processor, cause the processor to receive a first signal from a sensing system that is coupled to the body, the first signal being indicative of a temperature of the material. The testing system comprises instructions that, when executed by the processor, cause the processor to receive a second signal from the sensing system, the second signal being indicative of the temperature of a portion of the outer surface when the portion of the outer surface is in physical contact with the electronic device.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
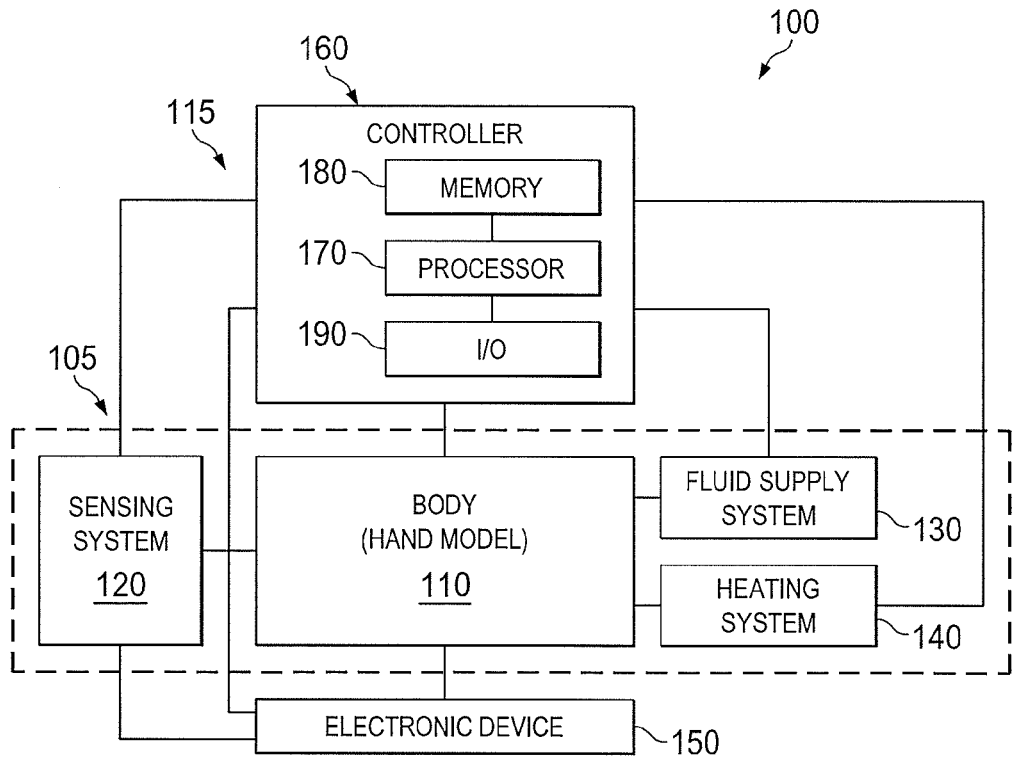
FIG. 1 illustrates an example of a testing system that simulates an effect of a surface temperature of an electronic device on skin of a human being when the electronic device is in contact with the skin of the human being according to disclosed embodiments.

FIG. 1 illustrates an example testing system 100 that is used to simulate the effect of a surface temperature of an electronic device 150 on the skin of a human being when the electronic device 150 is in contact with the skin of the human being, such as a human hand or wrist, without the need for using an actual human being for testing and potentially exposing the human hand or wrist to uncomfortably hot or burning temperatures. This enables thermal safety testing to be performed on the electronic device 150 over a relatively long period of time without the need to expose a human being to the potentially high surface temperature of the electronic device under test 150.

The electronic device 150 is configured to operate and/or communicate in the system 100. For example, the electronic device 150 may be configured to transmit and/or receive wireless signals or wired signals. The electronic device 150 represents any suitable end user device and may include such devices (or may be referred to) as a user equipment/device (UE), wireless transmit/receive unit (WTRU), mobile station, fixed or mobile subscriber unit, pager, cellular telephone, personal digital assistant (PDA), smartphone, laptop, computer, touchpad, wireless sensor, consumer electronics device, or "wristband" device. Although the device may be referred to as a "wristband" device, one of skill in the art would understand that a body-worn device worn on a different part of the anatomy (e.g., arm band, leg band, headband) may be utilized to provide these features.

The testing system 100 is configured to sense a temperature, and a temperature change, in material within a body 110 coupled to the electronic device 150. For example, the testing system 100 includes a testing apparatus 105 configured to heat the material within the body 110 via conduction heating, and a monitoring system 115 configured to measure temperature and temperature changes within the material.

An example of the testing system 100 will be described at least with reference to FIGS. 1-3. The testing system 100 includes a testing apparatus 105 coupled to a monitoring system 115. The testing apparatus 105 generally includes a body 110, a sensing system 120, a fluid supply system 130, and a heating system 140. As previously mentioned, the testing system 100 further includes the monitoring system 115 coupled to the testing apparatus 105. The monitoring system 115 is configured to simulate the effect of a surface temperature of the electronic device 150 on the skin of a human being (e.g., an outer surface of the body 110) when the electronic device 150 is in contact with the skin of the human being.

The body 110 is configured to contain the material 235, supply a heat to the material 235 to facilitate increasing, decreasing, and/or maintaining a temperature of the material 235, and sense a temperature or a change in temperature of the material 235. The material 235 may be, for example, any solid, liquid, gas, gel, and/or any suitable material that mimics human tissue. In a particular embodiment, the body 110 may be a light-weight, fluid-tight device adapted to resemble a human hand including a hand portion and a wrist portion, referred to herein as a hand model. One of skill in the art would understand that the body may resemble other body parts or appendages, such as a human foot including a foot portion and an ankle portion, a human head, a human arm, a human leg, a human torso, etc.

Figure 2A:
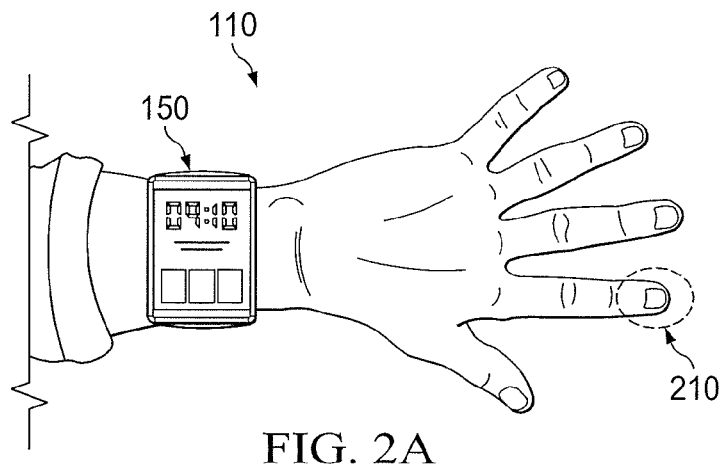
FIGS. 2A and 3A illustrate examples of a body in the form of a hand model that is used to simulate the effect of a surface temperature of an electronic device on the skin of a human being when the electronic device is in contact with the skin of the human being according to disclosed embodiments.
Figure 2B:
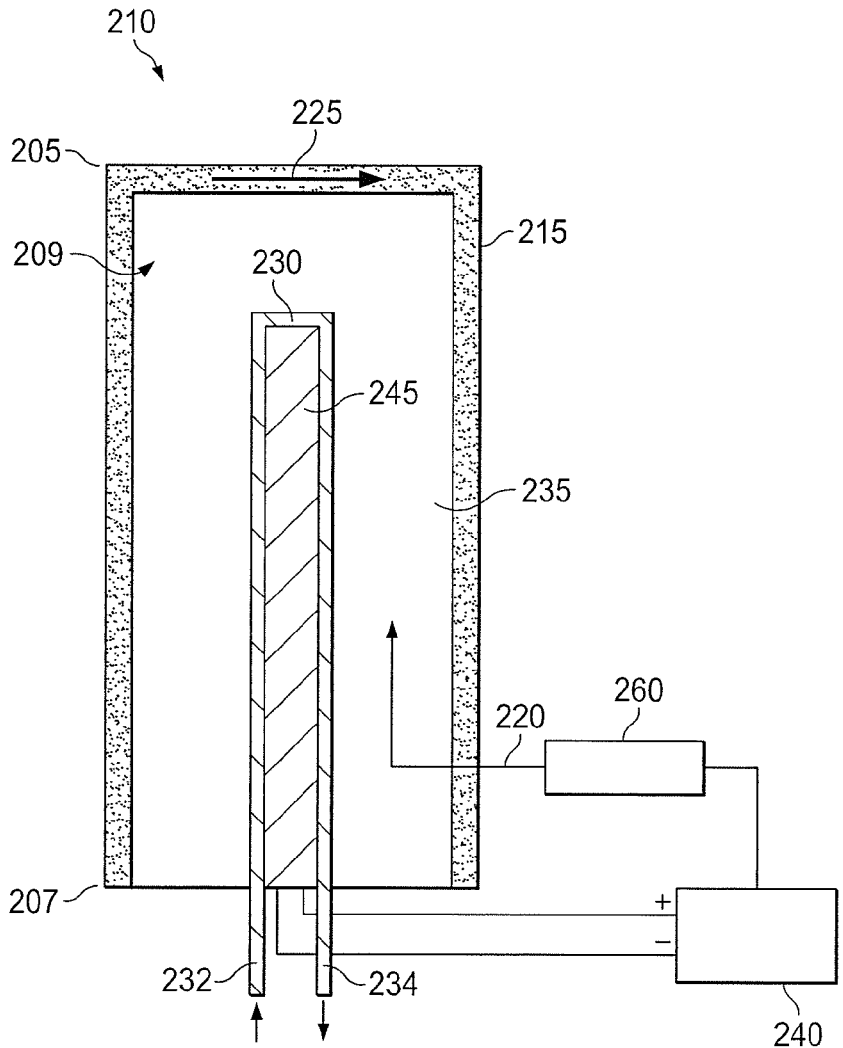
FIG. 2B illustrates a sectional view of a portion of a body that is used to simulate the effect of a surface temperature of an electronic device on the skin of a human being when the electronic device is in contact with the skin of the human being according to disclosed embodiments.
Figure 3A:
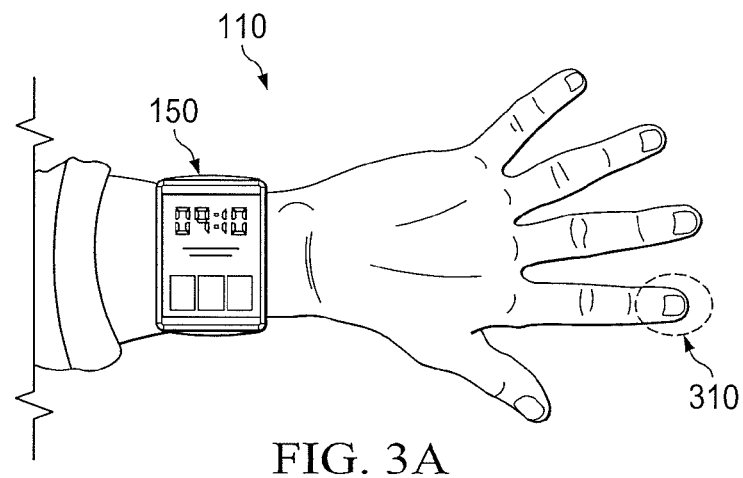
Figure 3B:
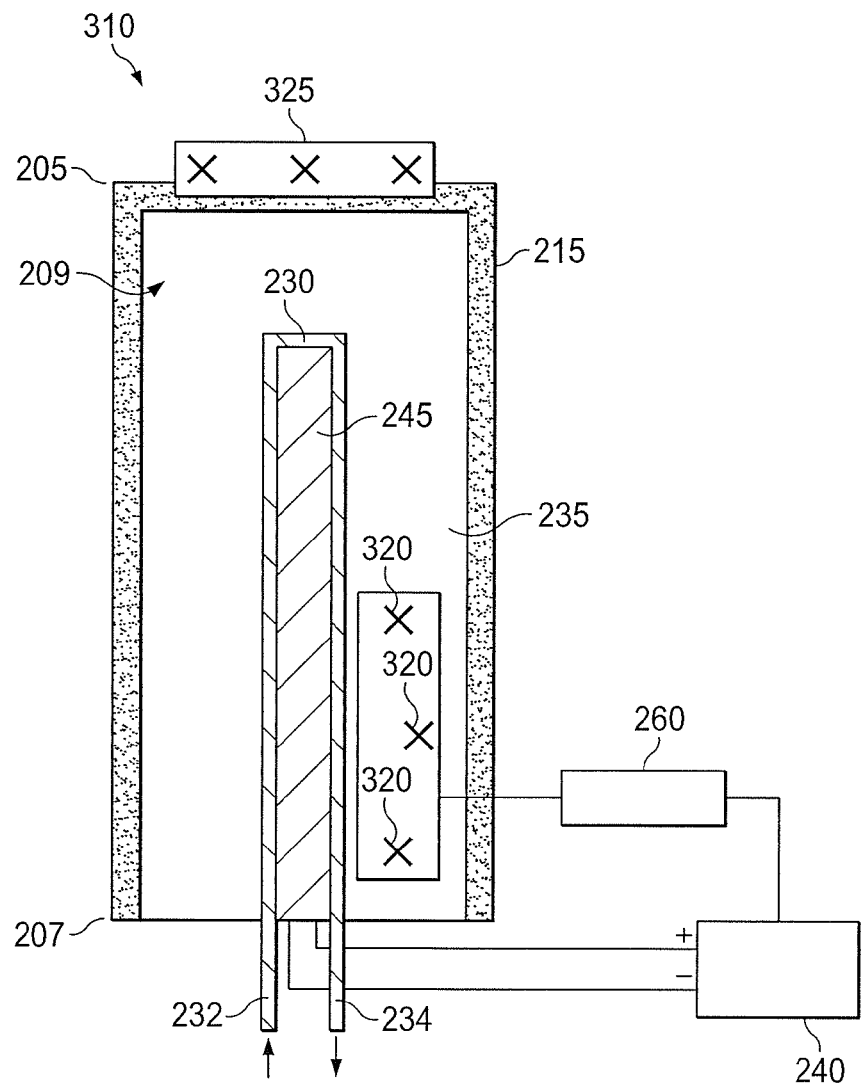
FIG. 3B illustrates a sectional view of another embodiment of a portion of a body that is used to simulate the effect of a surface temperature of an electronic device on skin of a human being when the electronic device is in contact with the skin of the human being according to disclosed embodiments.

FIG. 2 illustrates a sectional view of a blow-up of a portion 210 of the body 110. As illustrated, the portion 210 is a finger of a hand model that may be used to simulate the effect of a surface temperature of the electronic device 150 on the "skin" of a human being when the electronic device 150 is in contact with the body 110. Although a finger is illustrated, one of skill in the art would understand that other portions of the hand model, such as a wrist, a palm, multiple fingers, etc. may be utilized.

As illustrated in FIG. 2, the body 110 includes an outer surface 215 having a first end 205, a second end 207, and an inner surface that defines a cavity 209. As illustrated, the cavity 209 extends between the first end 205 and the second end 207. The cavity 209 is configured to receive a volume of material 235, such as a gel that mimics human tissue. In an exemplary embodiment, the outer surface 215 comprises an elastomer such as silicon rubber that mimics human skin. The silicon rubber and the gel have heat and thermal conductivity properties similar to human skin/human tissue.

The fluid supply system 130 is coupled to the body 110 and is generally configured to provide a fluid into the cavity 209 and to extract the fluid from the cavity 209. The fluid may be, for example, air, water, gas, and/or any suitable fluid. The fluid supply system 130 further includes a fluid source (not shown), a fluid inlet or supply line 232, and a fluid outlet or return line 234 disposed between the body 110 and the fluid source for channeling the fluid from the fluid source to the body 110. It will be appreciated by those skilled in the art that other components, such as a fluid control valve, a pressure relief valve, etc. may be included in the fluid supply system 130.

The heating system 140 is coupled to the body 110 and is generally configured to supply heat to and heat at least a portion of the material 235 via conduction, which will increase a temperature of the material 235. In an exemplary embodiment, the heating system 140 includes a power supply assembly 240 coupled to at least one heating element 245 (such as a heating probe or a film heater) that is positioned within the cavity 209. A fluid tube 230 is disposed around at least a portion of the heating element 245 and is configured to circulate fluid to cool the heating element 245 and to conduct heat from the heating element 245 into the material 235. In the illustrated example, the heating element 245 is configured to radiate heat along the length of the heating element 245 or any portion thereof (e.g., an upper portion, a middle portion, a lower portion, or any combination thereof). Alternatively, the heating system 140 may comprise thermoelectric heating/cooling. In that case, the heating element 245 would include thermoelectric materials and the fluid tube 230 would not be needed for cooling.

The power supply assembly 240 is configured to adjust a voltage supplied and provide power to the heating element 245 so that the heating element 245 can supply heat to the material 235 inside the cavity 209. The power supply assembly 240 is coupled to a controller circuit assembly 260. The controller circuit assembly 260 is configured to control power to the power supply assembly 240 by sensing a temperature of the material 235 via the sensing system 120 and operate the power supply assembly 240 to adjust the heat supplied to the material 235 to facilitate increasing, decreasing, and/or maintaining a temperature of the material 235.

In an exemplary embodiment, the heating system 140 is configured to heat the material 235 to a temperature of approximately 36.0 degrees Celsius. Alternatively, or in addition, the heating system 140 may be configured to heat the material 235 to other temperatures to mimic skin temperatures of different genders, races, and ages. For example, the heating system 140 may be configured to heat the material 235 in response to statistical temperature data for men, women, and children having different ages and/or races. For example, the "average" female skin temperature may be 0.5 degrees Celsius higher than the "average" male skin temperature and the testing system 100 may be configured to test the effect of the surface temperature of the device 150 on the skin of an average female user according to the higher average female skin temperature. Similarly, the average child skin temperature may be higher than the average male skin temperature and the testing system 100 may be configured to test the effect of the surface temperature of the device 150 on the skin of an average child user according to the higher average child skin temperature. In addition, the heating system 140 may be configured to heat the material 235 to other temperatures above or below the statistical averages.

The sensing system 120 is coupled to the body 110 and is generally configured to sense a temperature of the material 235 and a temperature of the outer surface 215. In an exemplary embodiment, the sensing system 120 includes a first sensing element, such as a first thermocouple 220, located close to the heating element 245 and disposed within the material 235. The first sensing element is configured to sense a temperature of the material 235. The sensing system 120 includes a second sensing element, such as a second thermocouple 225, coupled to the outer surface. The second sensing element may be attached to or disposed within the outer surface 215. The second sensing element is configured to sense a temperature of at least a portion of the outer surface 215 when the portion of the outer surface 215 is in physical contact with the electronic device 150. In addition, the second sensing element may sense a temperature of the outer surface 215 while the outer surface 215 is not in physical contact with the electronic device 150, and may also be configured to sense the temperature of the outer surface 215 in air or the temperature of the air.

Alternatively, the first sensing element may include one or more sensors 320 oriented a radial distance from the heating element 245 and positioned within the material 235. The sensors 320 may be configured to sense a temperature of the material 235 at a plurality of sensing locations within the material 235. Each sensor 320 may be positioned the same radial distance from the heating element 245. Alternatively, the radial distance of one or more of the sensors 320 from the heating element 245 may vary. Similarly, the second sensing element may include one or more sensors 325 configured to sense a temperature of at least a portion of the outer surface 215 when the portion of the outer surface 215 is in physical contact with the electronic device 150. The sensors 325 may sense a temperature of the outer surface 215 at a plurality of locations along the outer surface 215.

As previously mentioned, the testing system 100 further includes a monitoring system 115 coupled to the testing apparatus 105. The monitoring system 115 is configured to monitor a temperature of the material 235 both prior to and when the electronic device 150 is in contact with the body 110, monitor a surface temperature of the electronic device 150 both prior to and when the electronic device 150 is in contact with the body 110 (e.g., when the electronic device 150 is in contact with the "skin" of a human being such as a human hand or wrist), and to determine a temperature of a portion of the outer surface 215 (e.g., "skin") when the electronic device 150 is in contact with the portion of the outer surface 215.

The monitoring system 115 includes a controller 160 coupled to the sensing system 120, the fluid supply system 130, and the heating system 140. The controller 160 includes a processor 170 that is in communication with a memory 180 for executing programmed instructions. In some examples, executable instructions are stored in the memory 180. Alternatively, executable instructions may be retrieved from another device via a computer network. The memory 180 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

The controller 160 is programmable to perform one or more operations described herein by programming the processor 170. For example, the processor 170 may be programmed by encoding an operation as one or more executable instructions and providing the executable instructions in the memory 180. The processor 170 may include, but is not limited to, a general purpose central processing unit (CPU), a graphics processing unit (GPU), a microcontroller, a digital signal processor, a reduced instruction set computer (RISC) processor, an application specific integrated circuit (ASIC), a field programmable gate array, a programmable logic circuit (PLC), and/or any other circuit or processor capable of executing the functions described herein.

The controller 160 further includes an input/output device 190. The input/output device 190 facilitates interaction with a user. The input/output device 190 includes any suitable structure for providing information to or receiving information from a user, such as a speaker, microphone, keypad, keyboard, display, or touch screen.

The controller 160 is configured to operate the heating system 140 to apply heat to the material 235. The controller 160 receives signals that are indicative of a temperature of the material 235 from the sensing system 120 and receives signals that are indicative of the temperature of a portion of the outer surface 215 when the portion of the outer surface 215 is in contact with the electronic device 150 from the sensing system 120. For example, during testing, the monitoring system 115 is configured to sense the temperature of the material 235 via the first sensing element and to increase or decrease heat supplied to the material 235 via the heating element 245 based on the sensed temperature of the material 235.

The monitoring system 115 is configured to monitor a temperature of the electronic device 150 via one or more different sensors or thermocouples that are associated with the sensing system 120 and the electronic device 150. For example, another sensing element (e.g., a sensor, a thermocouple, etc.) (not shown) may be coupled to an outer surface (e.g., display, body, etc.) of the electronic device 150 to monitor a temperature of the outer surface of the electronic device 150. The monitoring system 115 is configured to sense a change in temperature of the outer surface of the electronic device 150 when the outer surface of the electronic device 150 is touched by the outer surface 215 via the other sensing element that is coupled to the outer surface of the electronic device 150.

The monitoring system 115 is configured to sense a temperature of a portion of the outer surface 215 when the portion of the outer surface 215 is in contact with the electronic device 150 via the second sensing element. To illustrate, the controller circuit 260 may receive signals from the thermocouple 220, sense a temperature increase or decrease of the material 235, and heat or cool the material 235 to a desired temperature, such as a statistical average temperature based on race, gender, age, etc., via the heating system 140 and/or the fluid supply system 130. Alternatively, the controller circuit 260 may receive signals from one or more of the sensors 320, sense a temperature increase or decrease of the material 235, and heat or cool the material 235 to a desired temperature via the heating system 140 and/or the fluid supply system 130.

The controller 160 may receive signals from the thermocouple 225 and sense a temperature of a portion of the outer surface 215 when the portion of the outer surface 215 is in contact with the electronic device 150. Alternatively, the controller 160 may receive signals from one or more of the sensors 325 and sense a temperature of the portion of the outer surface 215 when the portion of the outer surface 215 is in contact with the electronic device 150. In addition, the controller 160 may receive signals from the thermocouple 225 or the sensor 325 and sense a temperature of the outer surface 215 when the outer surface 215 is not in contact with the electronic device 150.

The monitoring system 115 may be configured to monitor a skin temperature profile of the body 110 and an electronic device temperature profile of the electronic device 150 over a short time period or over a long time period. This enables thermal safety testing to be performed on the electronic device 150 over a relatively long period of time without the need to expose a human being to the potential of hot or burning skin due to a high surface temperature of the electronic device 150. In addition, the monitoring system 115 may be configured to calculate a rate of change in temperature of the material 235 over a period of time. The monitoring system 115 may be configured to calculate a rate of change in temperature of the outer surface 215 over a period of time and estimate an effect of the surface temperature of the electronic device 150 on the skin of a human being based at least in part on the calculated rate of change in temperature of the outer surface 215.

Figure 4:
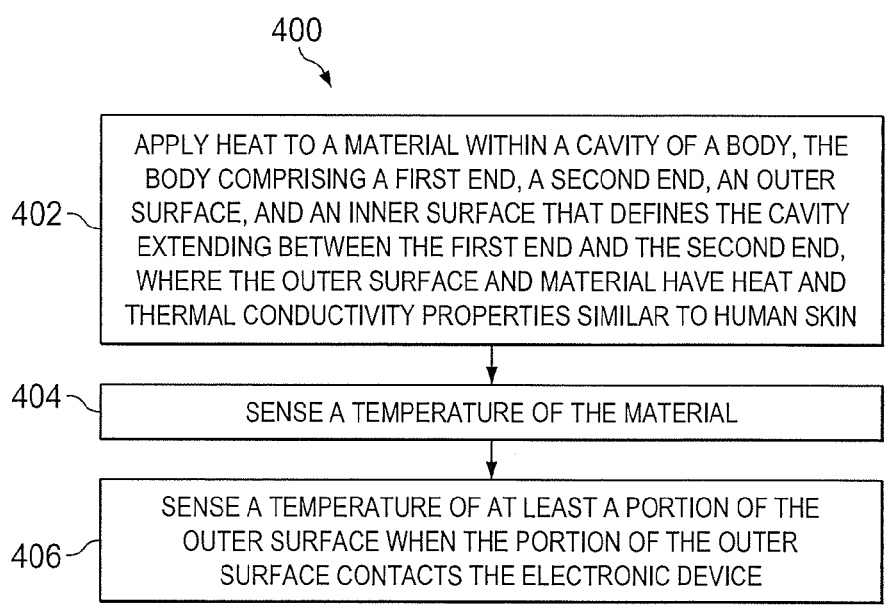
FIG. 4 illustrates a flow diagram of a method for simulating an effect of a surface temperature of an electronic device on skin of a human being when the electronic device is in contact with the skin of the human being according to disclosed embodiments.

FIG. 4 illustrates a flow diagram illustrating a method 400 of simulating the effect of a surface temperature of an electronic device on skin of a human being when the electronic device is in contact with the skin of the human being. The method comprises applying heat to a material within a body, at 402. The body comprises a first end, a second end, an outer surface that, and an inner surface that defines a cavity extending between the first end and the second end, where the outer surface has heat and thermal conductivity properties similar to human skin. For example, the heating system 140 is coupled to the body 110 and is generally configured to supply heat to and heat at least a portion of the material 235 via conduction.

The method comprises sensing a temperature of the material, at 404. For example, during testing, the monitoring system 115 senses the temperature of the material 235 via the first sensing element (e.g., the thermocouple 220, the one or more sensors 320) to increase or decrease heat supplied to the material 235 via the heating element 245 based on the sensed temperature of the material 235.

The method comprises sensing a temperature of at least a portion of the outer surface when the portion of the outer surface contacts the electronic device, at 406. For example, the controller 160 may receive signals from the sensing system 120, sense a temperature of the outer surface 215 of the body 110 when the electronic device 150 contacts the outer surface 215 of the body 110, and accurately simulate the effect of the surface temperature of the electronic device 150 on the skin of a human being when the electronic device 150 is in physical contact with the outer surface 215 of the body 110.

In some embodiments, some or all of the functions or processes of the one or more of the devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A testing apparatus for simulating an effect of surface temperature of an electronic device on skin of a human being when the electronic device is touched by the human being, the testing apparatus comprising:
 a body comprising a first end, a second end, an outer surface, and an inner surface that defines a cavity extending between the first end and the second end, the cavity configured to receive a material, the outer surface and the material having heat and thermal conductivity properties similar to human skin;
 a heating system coupled to the body and comprising at least one heating element, the at least one heating element extending at least partially through the material, the heating system configured to supply heat to at least a portion of the material to increase a temperature of the material; and
 a sensing system coupled to the body, the sensing system comprising:
  a first sensing element positioned within the material, the first sensing element configured to sense a temperature of the material, and a second sensing element coupled to the outer surface, the second sensing element configured to sense a temperature of a portion of the outer surface;
 wherein the sensing system is configured to monitor the temperature of the material and the temperature of the outer surface prior to when the portion of the outer surface contacts the electronic device and when the portion of the outer surface contacts the electronic device to determine a rate of change of the temperature of the portion of the outer surface and determine the effect of the surface temperature of the electronic device on the skin of the human being based on the rate of change of the temperature of the portion of the outer surface when the electronic device is in contact with the portion of the outer surface.

2. The testing apparatus in accordance with claim 1, further comprising a fluid supply system coupled to the body and comprising at least one fluid tube disposed around at least a portion of the heating element, the fluid tube configured to circulate fluid to cool the heating element and to conduct heat from the heating element into the material.

3. The testing apparatus in accordance with claim 1, wherein the sensing system is configured to sense a temperature of the outer surface at a plurality of locations along the outer surface.

4. The testing apparatus in accordance with claim 1, wherein the heating system is configured to heat the material to a plurality of temperatures including one or more temperatures that mimic skin temperatures of different genders, races, and ages of human beings.

5. The testing apparatus in accordance with claim 1, wherein at least one of the first sensing element and the second sensing element comprises a sensor.

6. The testing apparatus in accordance with claim 1, wherein at least one of the first sensing element and the second sensing element comprises a thermocouple.

7. The testing apparatus in accordance with claim 1, wherein the heating system further comprises:
 a power supply assembly coupled to the at least one heating element and configured to provide power to the heating element, the power supply assembly configured to adjust a voltage supplied to the heating element to adjust the heat supplied to the material; and
 a controller circuit assembly coupled to the power supply assembly and to the sensing system, the controller circuit assembly configured to sense a temperature of the material and to operate the power supply assembly to adjust the heat supplied to the material.

8. The testing apparatus in accordance with claim 1, wherein the outer surface comprises an elastomer and wherein the material comprises a gel.

9. The testing apparatus in accordance with claim 8, wherein the body comprises a substantially human hand form having a hand portion and a wrist portion.

10. The testing apparatus in accordance with claim 1, further comprising:
 a monitoring system coupled to the testing apparatus and comprising a controller in communication with the heating system and the sensing system, the controller comprising a processor including instructions that, when executed by the processor, cause the processor to:
 operate the heating system to apply heat to the material;
 receive a first signal from the first sensing element, the first signal indicating a temperature of the material; and
 receive a second signal from the second sensing element, the second signal indicating a temperature of the portion of the outer surface when the portion of the outer surface contacts the electronic device.

11. The testing apparatus in accordance with claim 10, wherein the processor further includes instructions that, when executed by the processor, cause the processor to sense a surface temperature of the electronic device.

12. The testing apparatus in accordance with claim 11, wherein the processor further includes instructions that, when executed by the processor, cause the processor to sense a change in temperature of an outer surface of the electronic device when the outer surface of the electronic device is touched by the outer surface of the body.

13. A testing system for simulating an effect of surface temperature of an electronic device on skin of a human being when the electronic device is touched by the human being, the testing system comprising:
 a processor; and
 memory coupled to the processor comprising instructions that, when executed by the processor, cause the processor to:
 operate a heating system that is coupled to a body having a cavity that contains a material, the heating system to apply heat to the material, the body comprising a first end, a second end, an outer surface, and an inner surface that defines the cavity extending between the first end and the second end, wherein the outer surface and the material have heat and thermal conductivity properties similar to human skin;
 receive a first signal from a sensing system that is coupled to the body, the first signal indicating a temperature of the material;
 receive a second signal from the sensing system, the second signal indicating a temperature of a portion of the outer surface;
 monitor the temperature of the material and the temperature of the outer surface prior to when the portion of the outer surface contacts the electronic device and when the portion of the outer surface contacts the electronic device to determine a rate of change of the temperature of the portion of the outer surface; and
 determine the effect of the surface temperature of the electronic device on the skin of the human being based on the rate of change of the temperature of the portion of the outer surface when the electronic device is in contact with the portion of the outer surface.

14. The system in accordance with claim 13, wherein the heating system comprises at least one heating element positioned within the cavity of the body, the at least one heating element extending at least partially through the material, the heating system configured to supply heat to at least a portion of the material to increase a temperature of the material.

15. The system in accordance with claim 14, wherein the sensing system comprises:
 a first sensing element positioned within the material, the first sensing element configured to sense a temperature of the material; and
 a second sensing element coupled to the outer surface, the second sensing element configured to sense a temperature of at least a portion of the outer surface when the portion of the outer surface contacts the electronic device.

16. The system in accordance with claim 14, further comprising a fluid supply system coupled to the body, wherein the fluid supply system comprises at least one fluid tube disposed around at least a portion of the heating element, the fluid tube configured to circulate fluid to cool the heating element and to conduct heat from the heating element into the material.

17. The system in accordance with claim 15, wherein at least one of the first sensing element and the second sensing element comprises a sensor.

18. The system in accordance with claim 15, wherein at least one of the first sensing element and the second sensing element comprises a thermocouple.

19. The system in accordance with claim 13, wherein the outer surface comprises an elastomer and wherein the material comprises a gel.

20. The system in accordance with claim 13, wherein the memory further comprises instructions that, when executed by the processor, cause the processor to sense a surface temperature of the electronic device.

21. The system in accordance with claim 20, wherein the memory further comprises instructions that, when executed by the processor, cause the processor to sense a change in temperature of an outer surface of the electronic device when the outer surface of the electronic device is touched by the outer surface of the body.

22. A method for simulating the effect of surface temperature of an electronic device on skin of a human being when the electronic device is touched by the human being, the method comprising:

applying heat to a material within a cavity of a body, the body comprising a first end, a second end, an outer surface, and an inner surface that defines the cavity extending between the first end and the second end, wherein the outer surface and the material have heat and thermal conductivity properties similar to human skin;

sensing a temperature of the material;

sensing a temperature of at least a portion of the outer surface when the portion of the outer surface contacts the electronic device;

monitoring the temperature of the material and the temperature of the outer surface prior to when the portion of the outer surface contacts the electronic device and when the portion of the outer surface contacts the electronic device to determine a rate of change of the temperature of the portion of the outer surface; and determining the effect of the surface temperature of the electronic device on the skin of the human being based on the rate of change of the temperature of the portion of the outer surface when the electronic device is in contact with the portion of the outer surface.

23. The method in accordance with claim 22, further comprising sensing a change in temperature of the outer surface when the portion of the outer surface contacts the electronic device.

24. The method in accordance with claim 23, further comprising sensing a surface temperature of the electronic device.

25. The method in accordance with claim 24, further comprising sensing a change in temperature of an outer surface of the electronic device when the outer surface of the electronic device is touched by the outer surface of the body.

* * * * *